(12) United States Patent
Burris et al.

(10) Patent No.: US 11,069,354 B2
(45) Date of Patent: Jul. 20, 2021

(54) VOICE-BASED TRANSACTION TERMINAL ORDERING

(71) Applicant: NCR Corporation, Atlanta, GA (US)

(72) Inventors: Matthew Robert Burris, Atlanta, GA (US); Shelby Frances Apps, Atlanta, GA (US); Andrew Cohen, Chamblee, GA (US); Gary C. Dalton, Lawrenceville, GA (US); Jason Robert Dyer, Indianapolis, IN (US); Jodessiah Sumpter, Roswell, GA (US)

(73) Assignee: NCR Corporation, Atlanta, GA (US)

( * ) Notice: Subject to any disclaimer, the term of this patent is extended or adjusted under 35 U.S.C. 154(b) by 110 days.

(21) Appl. No.: 16/426,953

(22) Filed: May 30, 2019

(65) Prior Publication Data
US 2020/0380969 A1    Dec. 3, 2020

(51) Int. Cl.
| | |
|---|---|
| *G10L 15/22* | (2006.01) |
| *G10L 15/18* | (2013.01) |
| *G06K 9/46* | (2006.01) |
| *G06Q 30/06* | (2012.01) |
| *G10L 13/00* | (2006.01) |
| *G06K 9/00* | (2006.01) |

(52) U.S. Cl.
CPC ............... *G10L 15/22* (2013.01); *G06K 9/46* (2013.01); *G06Q 30/0641* (2013.01); *G10L 13/00* (2013.01); *G10L 15/18* (2013.01); *G06K 9/00268* (2013.01); *G06K 2209/01* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 6,430,272 B1 * | 8/2002 | Maruyama | H04M 3/53333 379/67.1 |
| 9,646,295 B1 * | 5/2017 | Kanuganti | G06Q 20/325 |
| 10,475,451 B1 * | 11/2019 | Lynch | G10L 15/22 |
| 2007/0198432 A1 * | 8/2007 | Pitroda | G06F 21/606 705/64 |
| 2012/0253898 A1 * | 10/2012 | Berus | G06Q 30/0207 705/14.4 |
| 2015/0120633 A1 * | 4/2015 | Norlander | G16H 20/70 706/46 |
| 2015/0310446 A1 * | 10/2015 | Tuchman | G06Q 30/016 705/304 |
| 2016/0307196 A1 * | 10/2016 | Achhra | H04L 63/102 |
| 2017/0345010 A1 * | 11/2017 | Hagihara | G06Q 20/202 |
| 2018/0304311 A1 * | 10/2018 | Must | G07F 17/12 |

* cited by examiner

*Primary Examiner* — Quynh H Nguyen
(74) *Attorney, Agent, or Firm* — Schwegman, Lundberg & Woessner

(57) ABSTRACT

A consumer is identified at a transaction terminal. A natural-language voice chatbot is initiated for the transaction. The chatbot is configured with store information for a store associated with the terminal and, optionally, with preferences registered to the consumer. A natural language voice dialogue using, at least the store information, is initiated between the chatbot and the consumer while the consumer is at the terminal and during the transaction. The consumer may order store items from the store and pay for the items through the dialogue. In an embodiment, the items ordered are delivered to the terminal where the consumer is located.

2 Claims, 5 Drawing Sheets

US 11,069,354 B2

VOICE-BASED TRANSACTION TERMINAL ORDERING

BACKGROUND

Technology is substantially integrated into businesses and the everyday life of consumers. Businesses have added technology support to transact with their consumers over a variety of communication channels, some of which include consumer-operated devices.

In some environments even with existing technology item ordering, and item pickup can be problematic and inconvenient for the consumer. For example, when a consumer is purchasing fuel at a fuel pump of a convenience store, the user interface of the pump is typically small, hard to see at different times of the day, and usually has worn out entry keys or touchscreen displays. Furthermore, the consumer may have no idea as to what is available for purchase within the store beyond what is being actively advertised at the pump. The pump interfaces usually do not provide a complete item inventory or provide a searching mechanism for identifying a specific item. In fact, there is typically a limited list of items available within the store that the consumer can pre-purchase at the pump interface.

Moreover, although the consumer may be able to make a purchase from the less-than ideal user interface for a specific set of limited items, the consumer still must leave the pump to obtain the items from inside the store. This leaves the pump lane occupied while the consumer is purchasing something inside the store with the consumer's vehicle, thereby preventing other customers from accessing the consumer's pump lane. It is also extremely inconvenient for the consumer to move the vehicle to a new location on the premises for purposes of picking up a pre-purchased item or for purposes of browsing the store and purchasing items within the store. Convenience store lots are usually not very spacious, and maneuvering is difficult, particularly when the store and pumps are busy.

Consequently, it is not surprising that research has revealed that consumers willing or desiring to make convenience store purchases often do not make purchases while refueling their vehicles. Business estimate that a substantial amount of lost sales occurs when consumers are refueling, because it appears more likely that convenience store purchasers are consumers that come into the store to purchase specific snacks, drinks, lottery tickets, and the like without also purchasing fuel.

SUMMARY

In various embodiments, methods and a system for voice-based transaction terminal order processing are provided.

According to an embodiment, a method for voice-based transaction terminal order processing is presented. A user is identified at a terminal and information associated with the terminal is obtained. A natural language voice dialogue is initiated with the user while the user is located at the terminal.

DETAILED DESCRIPTION

Figure 1:
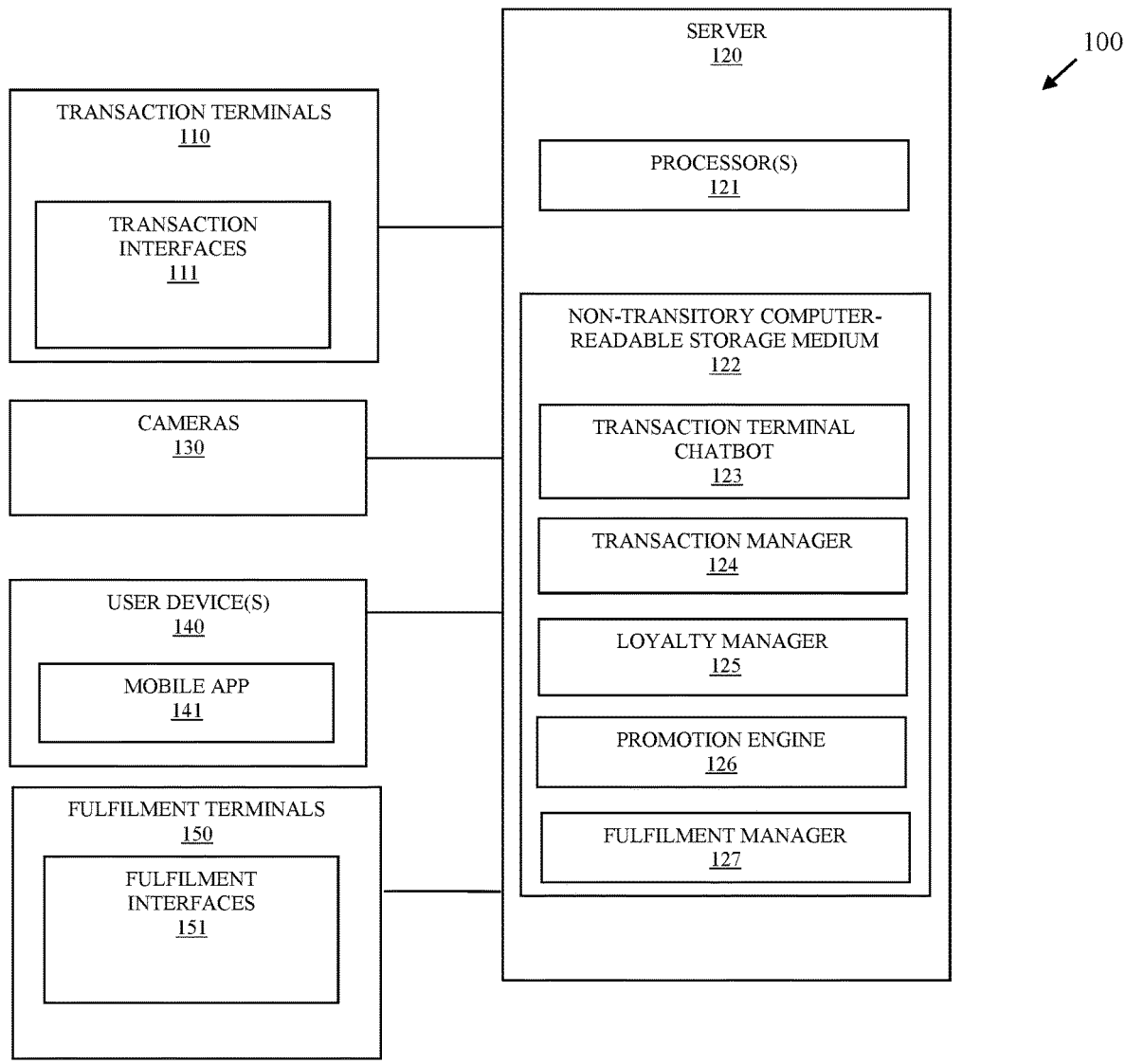
FIG. 1 is a diagram of a system for voice-based transaction terminal order processing, according to an example embodiment.

FIG. 1 is a diagram of a system 100 for voice-based transaction terminal order processing, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or with less components are possible without departing from the teachings of voice-based transaction terminal order processing, presented herein and below.

As used herein and below, the terms "user," "consumer," "user," and "customer" may be used interchangeably and synonymously. The terms refer to an individual placing an order at a transaction terminal.

System 100 includes a plurality of processing devices and device types 110-150. The system 100 includes transaction terminals 110, a server 120, cameras 130, user operated devices 140, and fulfilment terminals 150. Server 120 includes executable instructions that execute on one or more hardware processors 121 of server 120 from a non-transitory computer-readable storage medium 122 as: a transaction terminal chatbot 123, transaction manager 124, loyalty manager 125, promotion engine 126, and fulfilment manager 127.

It is to be noted that there may be multiple servers 120, such that the different elements 123-126 may execute on a same server 120 or multiple different servers 120 networked together. Furthermore, the server 120 may be a Local Area Network (LAN)-based server 120 or a Wide-Area Network (WAN)-based server 120.

In an embodiment, the server 120 is part of a cloud-processing environment that includes a plurality of servers logically cooperating of a network as a single accessible server 120.

Transaction terminals 110 include processors and non-transitory computer-readable storage media having executable instructions that when executed by the processor provide transaction interfaces 111.

User devices 140 include processors and non-transitory computer-readable storage media having executable instructions that when executed by the processor provide mobile applications (apps) 141.

Fulfilment terminals 150 include processors and non-transitory computer-readable storage media having executable instructions that when executed by the processor provide fulfilment interfaces 151.

The components of the system 120 permit customer-based personalized natural language voice ordering while a is customer at a transaction terminal 110. The natural language voice session/dialogue is performed by the transaction terminal chatbot 123 (hereinafter just "chatbot 123") through interaction with voice input provided by the customer through a speaker associated with the transaction terminal 110 or an integrated speaker of a consumer-operated device 140.

The order processing is provided as a natural-language voice session/dialogue between the customer and the chatbot 123 and the session can be initiated without any request being first made by the customer as soon as the customer initiates a transaction at terminal 110 or as soon as a customer is identified as being present at terminal 110. Additionally, the order session can be initiated based on a request or a voice-based question made by the customer while at the terminal 110.

The voice session/dialogue permits the customer to perform voice-based searches to discover items or services available at a store associated with terminal 110. Moreover, the voice session/dialogue permits the customer to: perform age-based verification when certain desired items are age-restricted (using cameras, card readers, or other peripheral devices associated with terminal 110), perform loyalty operations, and perform payment processing for any ordered items. Additionally, during the voice session/dialogue, the customer may request and receive from chatbot 123 information and guidance relevant to the customer's current location.

Chatbot 123 performs voice-to-text transaction of voice input received from the customer during the voice dialogue at terminal 110. The text is then processed to perform order processing for items or services available at a store associated with terminal 110. The text drives actions and causes chatbot 123 to interact with: transaction manager 124 for transaction processing, loyalty manager 125 for loyalty-based processing, promotion engine 126 for promotion processing, and fulfilment manager 127 for order fulfilment processing. Results or feedback from processing actions/operations with modules 124-127 are translated from text to speech (text-to-speech) and provided as audio during the voice dialogue to the customer over a speaker associated with terminal 110 or a speaker integrated into user device 140.

Transaction manager 124 may also interact with transaction interfaces 111 to update displayed information presented on displays of terminals 110 based on operations requested and driven by chatbot 123 during the voice dialogue. Similarly, fulfilment manager 127 may interact with fulfilment interfaces 151 to updated displayed information presented on displays of fulfilment terminals 150.

In some embodiments, chatbot 123 includes Application Programming Interfaces (APIs) that permit direct interaction with transaction interfaces 111 and fulfilment interfaces 151 independent of transaction manager 124 and fulfilment manager 127.

Chatbot 123 parses voice input supplied by the customer through a microphone of terminal 110, an integrated microphone of user device 140, and/or a microphone situated in proximity to but not entirely integrated within terminal 110. The audio is converted to text to identify an intention of the customer and identify actions/operations associated with 124-127. APIs of chatbot 123 then communicate the actions/operations to the appropriate modules 124-127. Results from the actions/operations are returned through the APIs as text. The text is then converted to natural language speech as audio and played over one or more of: a speaker integrated into terminal 110, a speaker integrated into user device 140, a headset wirelessly connected to user device 140, and a speaker that is no integrated into terminal 110 but is in proximity to terminal 110. Additionally, displayed information associated with the results from the actions/operations may be updated on display of terminal 110 through interfaces 111 by either chatbot 123 and/or transaction manager 124. So, a context associated with the voice dialogue may be maintained visually on a display during the voice dialogue. Spoken voice input may also be converted to text and displayed on any of the above-mentioned displays as feedback to the customer (so the customer can see when the customer's speech was incorrectly converted to text by chatbot 123).

The customer can be initially engaged in a variety of different manners for the voice dialogue with chatbot 123. For example, transaction manager 124 (upon receiving notice that a customer has been identified from interfaces 111 as initiating a transaction at term inal 110) may engage chatbot 123 and provide any information already known about that customer to chatbot 123. For example, a payment or loyalty card of the customer may have been inserted to a card reader of terminal 110 or wirelessly read by a contactless card reader of terminal 110. Transaction manager 124 may provide such information along with a terminal identifier for the terminal 110 to chatbot 123. In another case, a sensor (motion, image, audio) may be used to activate a camera integrated into or proximate to terminal 110. Chatbot 123 is notified of a presence of a customer and may utilize the images to perform facial recognition on the customer (assuming the customer has previously registered and authorized this). Similarly, a microphone may pick up speech of the customer at terminal 110 and perform voice print recognition on the customer (again assuming the customer has previously registered a voice print and authorized this). Transaction manager 124 may also report when an unknown customer has started a transaction at terminal 110, such as insertion of or reading of a card, pressing a key on terminal 110 (interfaces 111 report such activity to transaction manager 124 for purposes of begging a transaction). The customer may have previously registered for use of chatbot 123 and may have provided a wake-up word to a microphone integrated into or proximate to terminal 110, which causes chatbot 123 to initiate the dialogue.

As evidenced above, a voice dialogue may be initiated by either chatbot 123 or the customer and at the start or beginning of the dialogue (after initiation), the customer may be known to chatbot 123 or may be unknown to chatbot 123. That is, a known customer is one for which chatbot 123 has enough information to access a loyalty account associated with that customer and unique identify a customer identity for the customer, whereas an unknown customer is one for which the chatbot 123 does not have enough information to uniquely identify a customer identity and/or identify a known loyalty account for the customer. If a known customer is engaged in the dialogue with chatbot 123, then loyalty manager 125 is accessed and registered customer preferences are obtained and configured into the dialogue by chatbot 123 (this may also include a known transaction history for the customer). If an unknown customer is engaged in the dialogue with chatbot 123, then chatbot 123 may, as an initial part of the dialogue, ask (through natural language speech) whether the unknown customer is registered and is willing to provide loyalty information or whether the unknown customer want to register for a loyalty account through the voice dialogue. This can be done through interaction between chatbot 123 and loyalty manager 125.

It is to be noted that a customer does not have to register with a loyalty account to engage in the dialogue and order processing with chatbot 123. In such a case, the dialogue proceeds with the customer remaining anonymous to chatbot 123. However, when the customer includes a loyalty account and/or registers for a loyalty account a variety of personalization features are available to the customer during the order processing through chatbot 123.

Chatbot 123 after initiating the dialogue and identifying the customer (either as known and linked to a loyalty account, new and agreed to create a loyalty account, or unknown and proceeding anonymously), uses natural language speech to take a customer order for goods or services associated with the store. Any goods/products that require preparation can be sent to fulfilment personal through fulfilment interfaces 151 (such as food preparation). Fulfilment interfaces 151 may provide back an estimated time that the goods will be available to the customer based on the current load of the fulfilment personnel. Chatbot 123 communicates this through natural language to the customer during the dialogue. If a wait is unacceptable to the customer, the customer uses voice to change the order or cancel the order. Fulfilment terminals 150 may be mobile device carried by fulfilment personnel within the store, these mobile devices may be phones or tablets and the personnel may be item pickers that go through the store or stocking area of the store and pick ordered items desired by the customer. A transaction identifier for the customer transaction accompanies the items. The items are then delivered to a staging area where other fulfilment personnel deliver the items directly to the customer at the terminal 110 and/or a predesignated area associated with pickup at the store.

Chatbot 123 may also use natural language to perform item searching in store item inventory to inform the customer whether desired items are available in the existing inventory of the store. Chatbot 123 may provide an alternative item for any item desired that is unavailable in the inventory but determined to be equivalent to the desired item when the alternative item is determined to be in store inventory.

Chatbot 123 may also perform payment processing for the ordered items. This can be done in a variety of manners through integration with interfaces 111 and transaction manager 124. Assuming the customer has already provided a payment card at terminal 110, such as when terminal 110 is a fuel pump and the customer is fueling a vehicle where the payment card is needed to activate the pump, the amount of the purchased items may be added to the already provided payment card (assuming the total price of the fuel and the items purchased do not exceed the hold amount placed on the card when provided by the card provider), the amount associated with the purchased items may be processed through a registered payment method associated with a loyalty account of the customer (assuming this is a registered customer), or the amount associated with the purchased items may be placed on the previously presented card used to purchase the fuel by chatbot 123 asking through voice that the customer re-provided the card for payment of the items separate from the purchase of fuel.

Additionally, in some instances purchased items may necessitate by government regulation that the age of the customer be verified (such as when purchasing lottery tickets, alcohol, and tobacco products). In such cases, chatbot 123 may perform such verification in a variety of manners. For instance, chatbot 123 may ask the customer to present a government issued photo identification card to a camera integrated into terminal 110, a camera in proximity to terminal 110, or through an integrated camera of customer device 140 through mobile app 141. The necessary information to verify the age of the customer is then extracted from an image taken of the photo identification card and retailed by transaction manager 124 for any necessary governmental compliance.

Also, chatbot 123 may provide and redeem promotions during the dialogue by interaction through an API with promotion engine 126 and verbally informing the customer of promotions associated with the store or items of the store (which may or may not be related to items ordered by the customer during the dialogue).

Still further, chatbot 123 may provide other non-store related and non-order related services during the dialogue, such as directions to a restaurant near terminal 110, weather forecast, sport scores, stock prices, points-of-interest nearby terminal 110, and other services.

In an embodiment, chatbot 123 may dynamically move the voice and display based feedback from terminal 110 to customer-operated device 140 upon request of the customer or based on preferences of the customer obtained from the loyalty account. Interaction, between customer and chatbot 123 proceeds through device 140. In an embodiment, the dialogue can be switched back and forth between terminal 110 and device 140 multiple times during the dialogue upon voice requests of the customer.

In an embodiment, transaction terminal 110 is a Self-Service Terminal (SST), an Automated Teller Machine (ATM), a kiosk, or a Fuel Pump.

In an embodiment, the preferences are used to customize the dialogue. The preferences are obtained from the loyalty account of the customer and the preferences may also be changed by the customer during the dialogue upon customer voice instructions made to chatbot 123. The preferences include, by way of example only, preferred spoken language of the customer, preferred payment method of the customer, preferred products of the customer, preferred price ranges for any of the preferred products, notifications that are to be provided when a product is available in inventory of a given store or falls below a customer-set price, preferred updates on news/sports scores/sports teams, preferred interaction device (terminal 110 or device 140), preferred method of receiving receipts (printed at terminal 110, emailed, texted, etc.), preferred restaurants, preferred foods, and others.

In an embodiment, user device 140 is a phone, a tablet, or a laptop, a wearable processing device, a portable Internet-of-Things (loTs) device carried in a vehicle of the customer, or a device integrated into the vehicle of the customer.

In an embodiment, fulfilment terminals 150 are desktop computers, laptop computers, Point-Of-Sale (POS) terminals, tablets, phones, or wearable processing devices.

In an embodiment, the dialogue may be transcribed into text and sent as a text or email to the customer when the session ends, upon request of the customer.

In an embodiment, the chatbot 123 includes a trained machine-learning algorithm that is continuously learning and improving its spoken capabilities and accuracy for order processing.

In an embodiment, metrics are retained for the transaction and the dialogue for purposes of reporting and evaluating accuracy of marking campaigns, promotions, etc.

There are several variations on how the system 100 can operate, some of which are discussed above and some of which are more completely discussed below with the other FIGS. 2-5.

Figure 2:
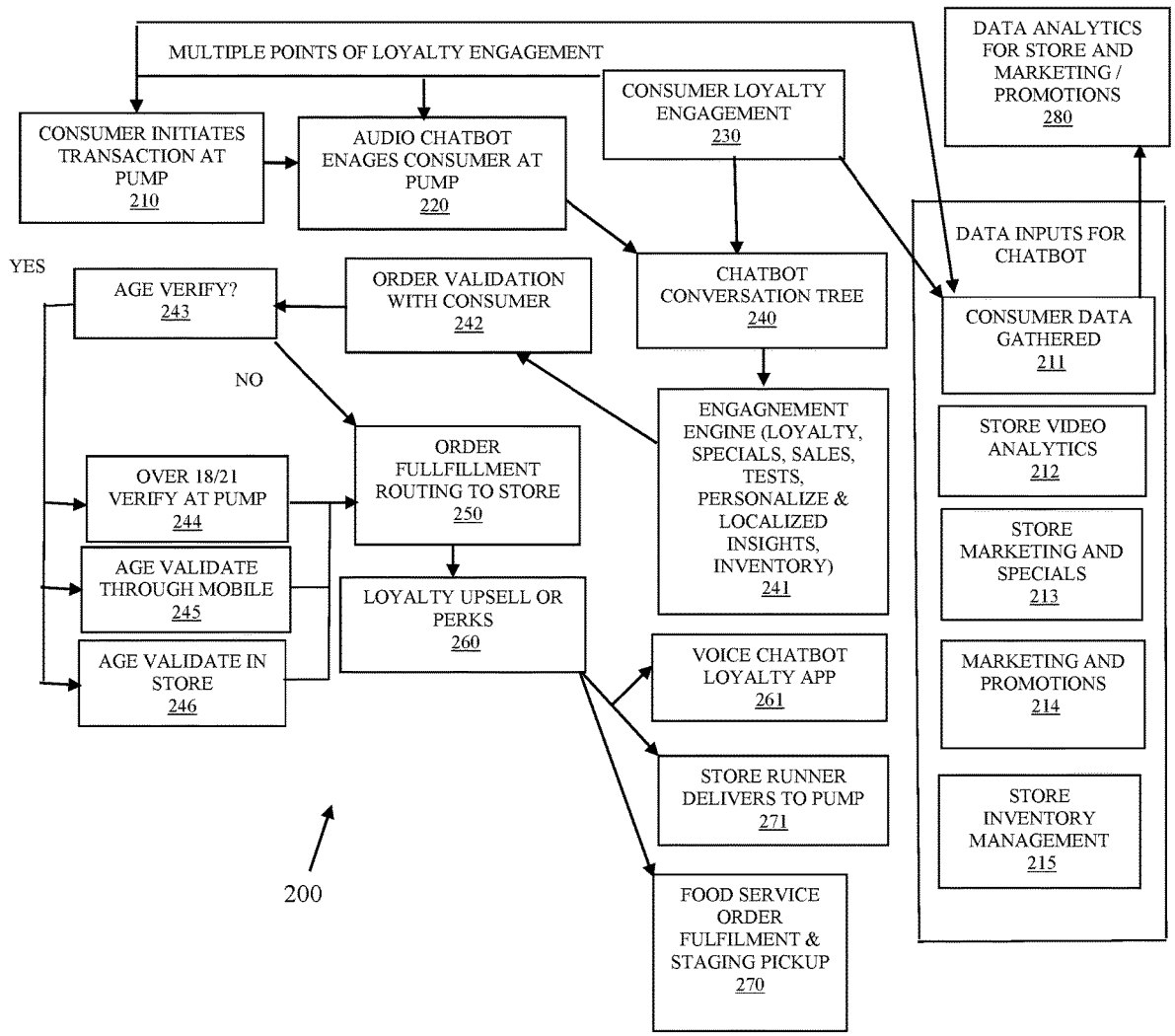
FIG. 2 is a diagram of processing associated with voice-based transaction terminal order processing, according to an example embodiment.

FIG. 2 is a diagram of processing associated with voice-based transaction terminal order processing of system 100, according to an example embodiment.

At 210, the consumer initiates a transaction at a fuel pump 110 (one example type of transaction terminal 110) and chatbot 123 is initiated for a voice dialogue with the consumer. Alternatively, at 220, the presence of the consumer is detected at pump 110 (such as through any of the above-mentioned techniques) and chatbot 123 is initiated. Still further, at 230, chatbot 123 is engaged automatically upon the consumer entering loyalty information and/or providing a loyalty card for reading at pump 110.

Once engaged, at 211, data inputs for configuring the dialogue are obtained such as consumer data 211 (loyalty based information including preferences), camera images of the consumer while at the pump captured by cameras 130 integrated into or proximate to pump 110 (store video analytics 212), current store marketing and specials 213, current marking and promotions available at the store 214, and store inventory management information 215.

The information 211-215 is then used as a knowledge store for the current consumer during the dialogue and a conversation tree is formed from that knowledge store at 240. The consumer is then engaged, at 241, the dialogue can include discussion relevant to loyalty specials, sales, tests, personalized and localized insights, and product inventory at the store.

During the dialogue, the consumer order is taken and once taken the order is verified at 242 (this can be both through speech and through a display associated with pump 110 or user device 140). Any purchased products requiring age verification are determined at 243. Store requirements and local governmental regulations may drive whether the age verification can be done through chatbot 123 or are required to be performed in the store at 246. When store and governmental rules permit, the consumer can be verified through the pump at 244 or through the mobile app 141 on user device 140 (such as through the presentation of a government-issued photo identification card that a camera captures an image for, as discussed above).

At 250, any ordered items are routed by chatbot 123 to fulfilment terminals 150, at 250.

During the dialogue and after the order is completely confirmed, chatbot 123 may verbally engage the consumer for loyalty based upselling items or loyalty-based perks available to the consumer, at 260. When the consumer is not registered for loyalty a specialized voice loyalty chatbot may be initiated by chatbot 123, at 261 to register the consumer with a loyalty account assuming the consumer desired the loyalty upsell or perks at 260 and lacks an existing loyalty account. The specialized loyalty chatbot then registered the consumer for a new loyalty account gathering through voice and/or images taken of payment and identification cards.

At 270, food items or non-food items that were ordered are placed in a staging and pickup area of the store.

At 271, a runner (store personnel) may, optionally, deliver the ordered items to the consumer at the pump one retrieved from the staging area.

At 280, data analytics for store and marketing/promotions presented, rejected, and/or accepted during the dialogue by chatbot 123 are captured and stored for evaluation of successes and for reporting.

These and other embodiments are now discussed with reference to the FIGS. 3-4.

Figure 3:
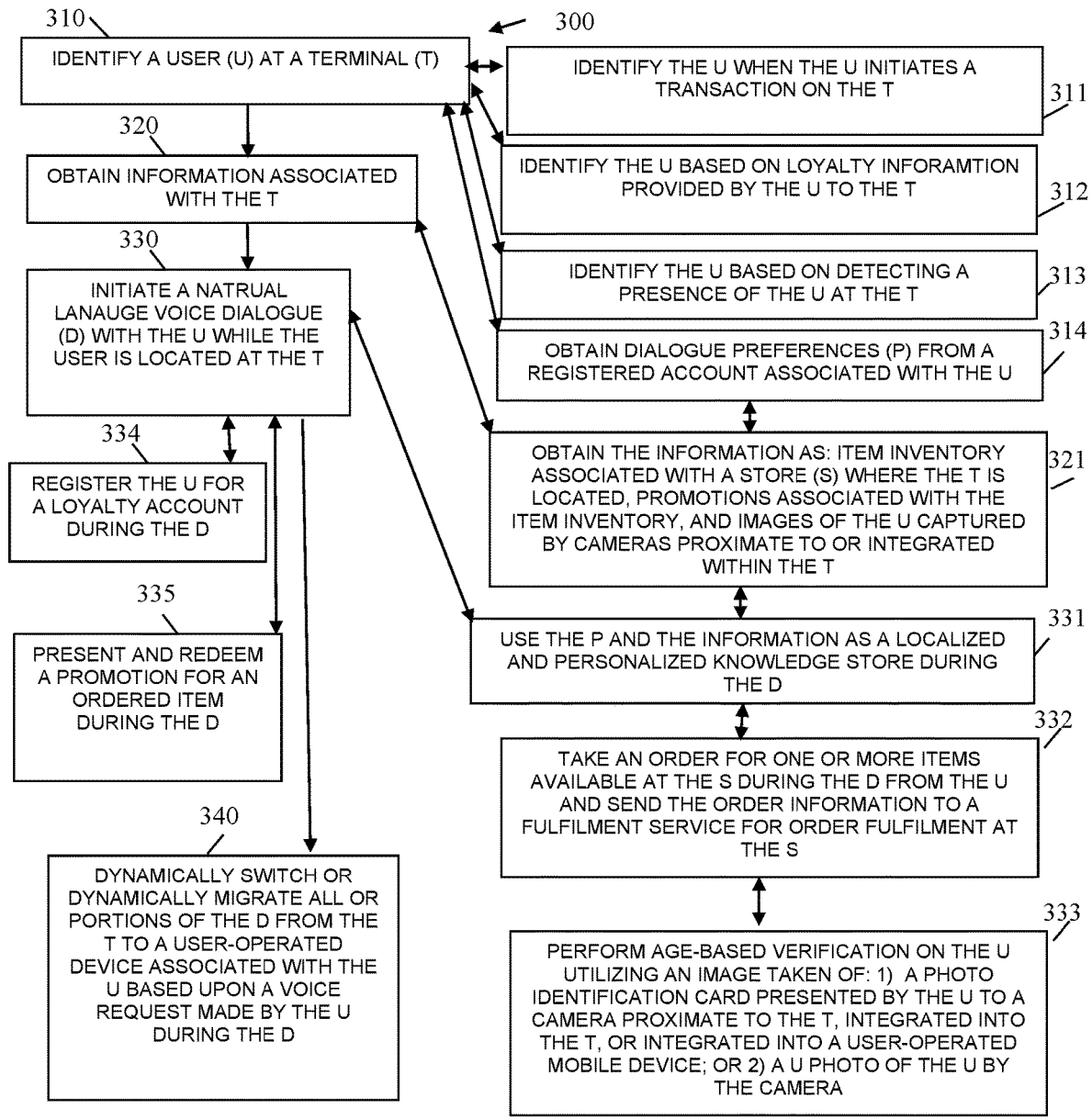
FIG. 3 is a diagram of a method for voice-based transaction terminal order processing, according to an example embodiment.

FIG. 3 is a diagram of a method 300 for voice-based transaction terminal order processing, according to an example embodiment. The software module(s) that implements the method 300 is referred to as an "order chatbot." The order chatbot is implemented as executable instructions programmed and residing within memory and/or a non-transitory computer-readable (processor-readable) storage medium and executed by one or more processors of a device.

The processor(s) of the device that executes the order chatbot are specifically configured and programmed to process the order chatbot. The order chatbot may have access to one or more network connections during its processing. The network connections can be wired, wireless, or a combination of wired and wireless.

In an embodiment, the device that executes the order chatbot is the server 120. In an embodiment, the server 120 is a cloud-based processing environment comprising a collection of physical servers cooperating as a single logical server. In an embodiment, the server 120 is a Local-Area Network (LAN)-based server or a Wide-Area Network (WAN)-based server.

In an embodiment, the order chatbot is all or some combination of the chatbot 123, the transaction manager 124, the loyalty manager 125, the promotion engine 126, and/or fulfilment manager 127.

At 310, the order chatbot identifies a user at a terminal. This can be achieved in any of the manners discussed above with the FIGS. 1-2.

For example, and in an embodiment, at 311, the order chatbot identifies the user when the user initiates a transaction on the terminal, such as when the user presents a contact-based or contactless payment card to initiate a transaction with a terminal that is a fuel pump terminal.

As another example, at 312, the order chatbot identifies the user based on loyalty information provided by the user to the terminal. This can be through entry of user information on an interface of the terminal, presentation of a loyalty card for reading by a card reader of the terminal, or presentation of the loyalty card to a camera integrated into or proximate to the terminal that snaps an image of the card and performs image processing to obtain a user loyalty account number from the card image.

In still another example, at 313, the order chatbot identifies the user based on detecting a presence of the user at the terminal. This can be done through cameras, microphones, and/or motion sensors associated with the terminal.

In an embodiment, at 314, the order chatbot obtains dialogue preferences from a registered account associated with the user. The preferences can be any of the above-mentioned preferences with the FIGS. 1-2.

At 320, the order chatbot obtains information associated with the transaction terminal.

In an embodiment of 314 and 320, at 321, the order chatbot obtains the information as: item inventory associated with a store where the terminal is located, promotions associated with the item inventory, and images of the user captured by cameras proximate to or integrated within the terminal as integrated peripheral devices. In an embodiment, the images of the user are imaged process to identify facial features of the user during the transaction and the facial features are mapped to actions or responses made by the order chatbot to the user during the transaction.

At 330, the order chatbot initiates a natural language voice dialogue with the user while the user is located at the terminal.

In an embodiment of 321 and 330, at 331, the order chatbot uses the preferences of the user and the information as a localized and personalized knowledge store during the natural language voice dialogue.

In an embodiment of 331 and at 332, the order chatbot takes an order for one or more items that are available at the store based on the item inventory during the natural language voice dialogue from the user. The order chatbot sends order information associated with the order to a fulfilment service 151 for order fulfilment at the store.

In an embodiment of 332 and at 333, the order chatbot performs age-based verification on the user utilizing an image taken of: a photo identification card presented by the user to a camera that is proximate to the terminal, integrated into the terminal, or integrated into a user-operated mobile device 140; or 2) a photo of the user that is processed to determine whether the user is over a preconfigured age, such as twenty, thirty or an age determined to be acceptable for visual verification by governmental authorities through visual verification in the area associated with the site.

In an embodiment, at 334, the order chatbot registers the user for a loyalty account during the natural language voice dialogue.

In an embodiment, at 335, the order chatbot presents and redeems a promotion for an ordered item during the natural language voice dialogue.

According to an embodiment, at 340, the order chatbot dynamically switches or dynamically migrates all or portions of the natural language voice dialogue from the terminal to a user-operated device 140 associated with the user based upon a voice request made by the user during the natural language voice dialogue or based upon a content associated with a response being provided by the order chatbot during the natural language voice dialogue.

Figure 4:
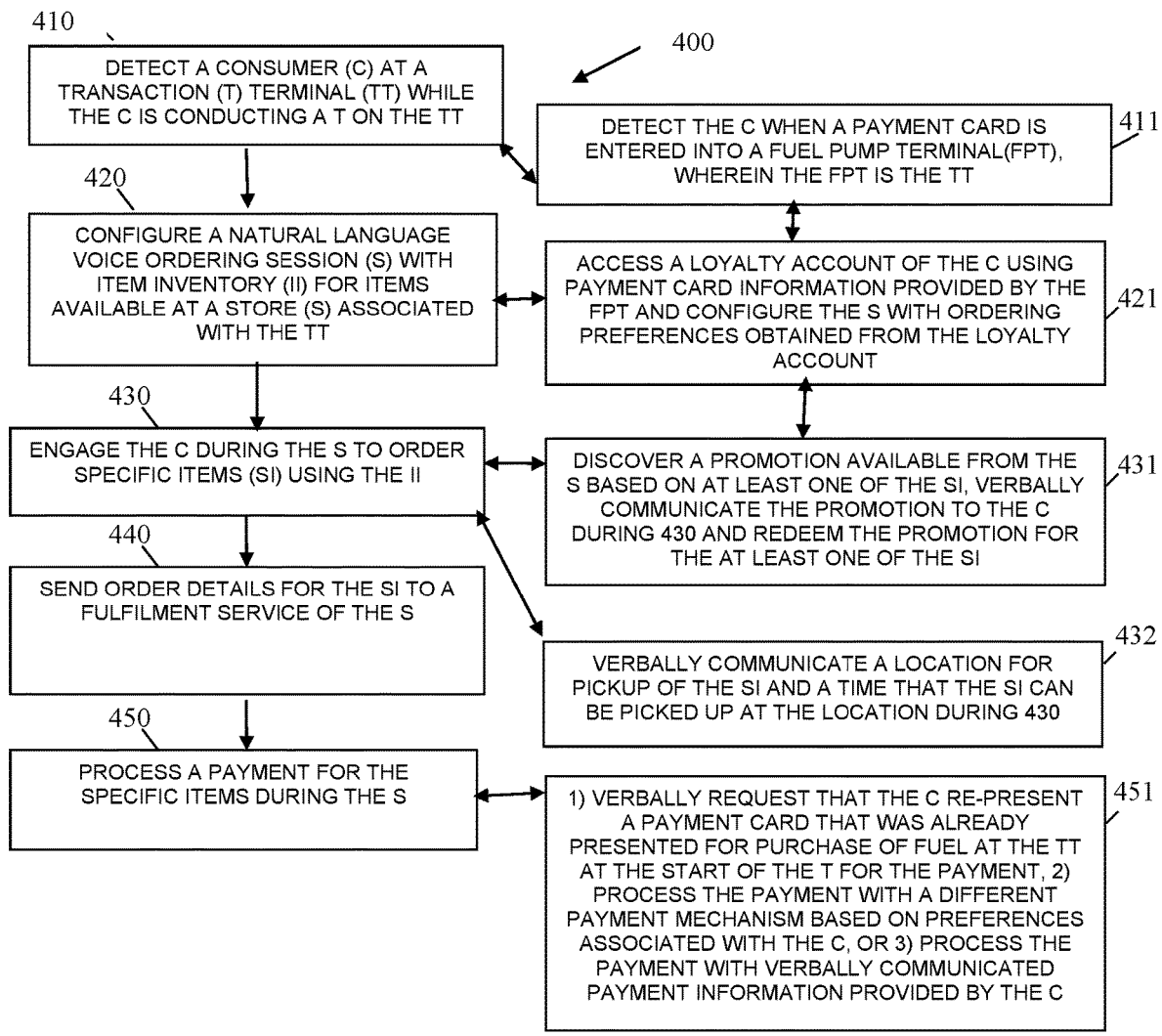
FIG. 4 is a diagram of another method for voice-based transaction terminal order processing, according to an example embodiment.

FIG. 4 is a diagram of another method 400 for voice-based transaction terminal order processing according to an example embodiment. The software module(s) that implements the method 400 is referred to as a "speech-based order manager." The speech-based order manager is implemented as executable instructions programmed and residing within memory and/or a non-transitory computer-readable (processor-readable) storage medium and executed by one or more processors of a device. The processors that execute the speech-based order manager are specifically configured and programmed to process the speech-based order manager. The speech-based order manager may have access to one or more network connections during its processing. The network connections can be wired, wireless, or a combination of wired and wireless.

In an embodiment, the device that execute the speech-based order manager is the server 120. In an embodiment, the server 120 is a cloud processing environment, a LAN server, or a WAN server.

In an embodiment, the speech-based order manager is all of or some combination of: chatbot 123, transaction manager 124, loyalty manager 125, promotion engine 126, fulfilment manager 127, and/or the method 300.

The speech-based order manager presents another and, in some ways, enhanced processing perspective of the method 300.

At 410, the speech-based order manager detects a consumer at a transaction terminal while the consumer is conducting a transaction on the transaction terminal.

In an embodiment, at 411, the speech-based order manager detects the consumer when a payment card is entered into a fuel pump terminal. The fuel pump terminal including a card reader for reading the card either through contactless card reading or contact-based card reading. The card information may also be entered through a keypad of the fuel pump terminal or a touch screen display of the fuel pump terminal. The fuel pump terminal is the transaction terminal.

At 420, the speech-based order manager configures a natural language voice ordering session with item inventory for items available at a store associated with the transaction terminal.

In an embodiment of 411 and 420, at 421, the speech-based order manager accessed a loyalty account of the consumer using payment card information provided by the fuel pump terminal and configures the natural language voice session with ordering preferences obtained from the loyalty account.

At 430, the speech-based order manager engages the consumer during the natural language voice ordering session to order specific items using the item inventory.

In an embodiment of 421 and 430, at 431, the speech-based order manager discovers a promotion available from the store based on at least one of the specific items that the consumer is purchasing. The speech-based order manager verbally communicates the promotion to the consumer during the natural language voice ordering session (430) and redeems the promotion for that item.

In an embodiment, at 432, the speech-based order manager verbally communicates a location for pickup of the specific items and a time that the specific item can be or is available for pickup at the location during the natural language voice ordering session (430).

At 440, the speech-based order manager sends order details for the specific items to a fulfilment service 151 of the store.

At 450, the speech-based order manager processes a payment for the specific items that were order during the natural language voice ordering session.

In an embodiment, at 451, the speech-based order manager performs one of when processing the payment: 1) verbally requests that the consumer re-present a payment card that was already presented for purchase of fuel at the transaction terminal at a start of the transaction for the payment; 2) process the payment with a different payment mechanism based on preferences associated with the consumer; or 3) processes the payment with verbally communicated payment information provided by the consumer during the natural language voice ordering session.

Figure 5:
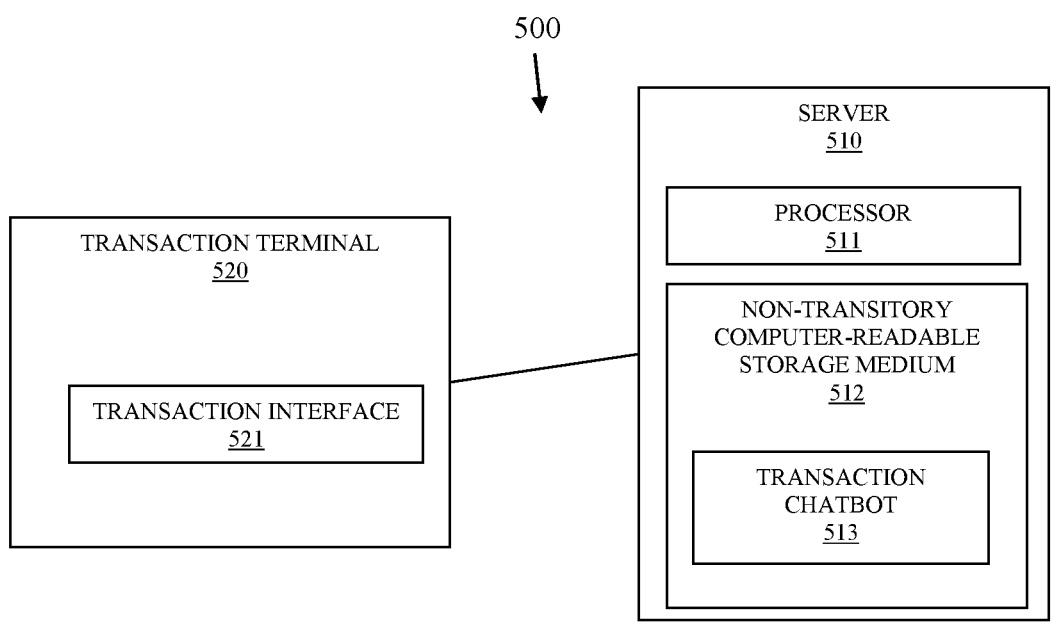
FIG. 5 is a diagram of another system for voice-based transaction terminal order processing, according to an example embodiment.

FIG. 5 is a diagram of a system 500 for voice-based transaction terminal order processing, according to an example embodiment. The system 500 includes a variety of hardware components and software components. The software components of the system 500 are programmed and reside within memory and/or a non-transitory computer-readable medium and execute on one or more processors of the system 500. The system 500 communicates over one or more networks, which can be wired, wireless, or a combination of wired and wireless.

In an embodiment, the system 500 implements, inter alia, the processing described above with the FIGS. 1-4.

The system 500 includes: a server 510 having a processor 511 and non-transitory computer-readable storage media 502 having executable instructions representing a transaction chatbot 513. The system 500 also includes transaction terminal 520 having a transaction processor and a transaction non-transitory computer-readable storage medium including executable instructions representing a transaction interface 521.

In an embodiment, server 510 is server 120. In an embodiment, server 120 is a cloud-based server, a LAN-based server, or a WAN-based server.

In an embodiment, terminal 520 is terminal 110. In an embodiment, terminal 110 is a SST, a kiosk, an ATM, or a fuel pump (as discussed in the FIG. 2).

In an embodiment, transaction chatbot 513 is all or some combination of the chatbot 123, transaction manager 123, loyalty manager 125, promotion engine 126, fulfilment manager 127, the processing discussed in the FIG. 2, the method 200, and/or the method 300.

In an embodiment, transaction interface 521 is transaction interface 111.

The transaction chatbot 513 when executed by the processor 511 from the non-transitory computer-readable storage medium 513 causes the processor 511 to: 1) interact with the transaction interface 521 and the transaction terminal 520 to identify a consumer performing a transaction on the transaction terminal 520; 2) obtain preferences from an account of the consumer with the store and store item inventory and item pricing information for items of a store associated with the transaction terminal 520; 3) initiate a natural-language voice session with the consumer while at the transaction terminal 520 and during the transaction using the preferences and the store item inventory and item pricing information as a localized and personalized knowledge store for the natural-language voice session; and 4) perform a voice directed order and purchase of specific items during the natural-language voice session on behalf of the consumer and the store;

Transaction interface 521 when executed by terminal processor from terminal non-transitory computer-readable storage medium causes the terminal processor to: 1) interact with the transaction chatbot 513 during the natural-language voice session; and 2) present a text-based representation of the natural-language voice session as feedback on a display of the transaction terminal 520 based on text data and instructions provided by the transaction chatbot 513.

In an embodiment, the transaction chatbot 513 when executed by the processor 511 from the non-transitory computer-readable storage medium 512 is further configured to cause the processor 511 to: 1) verbally communicate and redeem promotions provided by the store during the natural language voice session with the consumer; and 2) dynamically communicate portions of the natural language voice session to a consumer-operated device. In an embodiment, the portions are information communicated as text only to the consumer-operated device provided as a security measure for the text to the consumer during the natural language voice session.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A system, comprising:
a server comprising a processor and a non-transitory computer-readable storage medium having executable instructions representing a transaction chatbot;
a transaction terminal comprising a terminal processor and a terminal non-transitory computer-readable storage medium having executable instructions representing a transaction interface;
the transaction chatbot when executed by the processor from the non-transitory computer-readable storage medium is configured to cause the processor to:
 interact with the transaction interface and the transaction terminal to identify a consumer performing a transaction on the transaction terminal;
 obtain preferences from an account of the consumer with the store and store item inventory and item pricing information for items of a store associated with the transaction terminal;
 initiate a natural-language voice session with the consumer while at the transaction terminal and during the transaction using the preferences and the store item inventory and item pricing information as a localized and personalized knowledge store for the natural-language voice session; and
 perform a voice directed order and purchase of specific items during the natural-language voice session on behalf of the consumer and the store;
the transaction interface when executed by the transaction processor from the transaction non-transitory computer-readable storage medium is configured to cause the transaction processor to:
 interact with the transaction chatbot during the natural-language voice session; and
 present a text-based representation of the natural-language voice session as feedback on a display of the transaction terminal based on text data and instructions provided by the transaction chatbot.

2. The system of claim 1, the transaction chatbot when executed by the processor from the non-transitory computer-readable storage medium is further configured to cause the processor to:
verbally communicate and redeem promotions provided by the store during the natural language voice session with the consumer; and
dynamically communicate portions of the natural language voice session to a consumer-operated device.

* * * * *